Feb. 7, 1950  C. A. DE GIERS ET AL  2,496,339
WIND DIRECTION INDICATOR
Filed Nov. 15, 1945
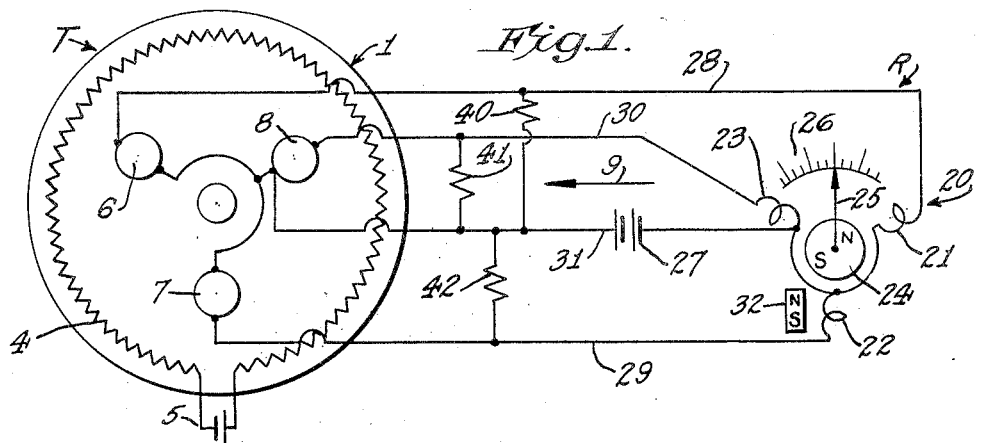
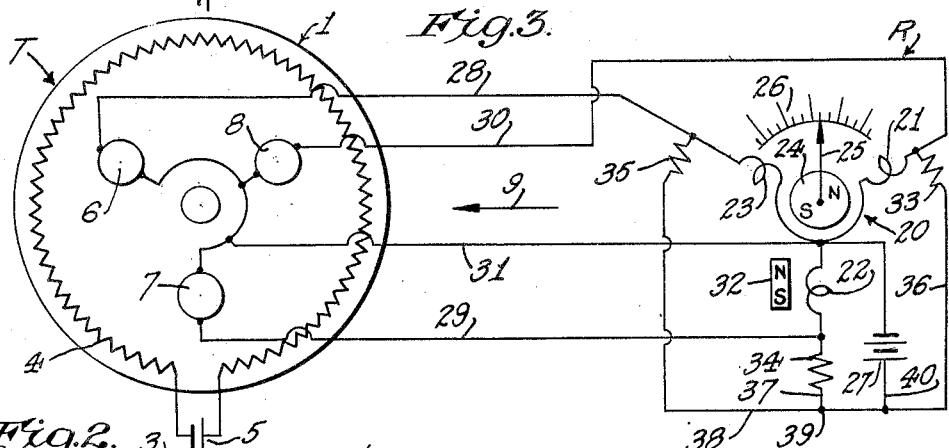
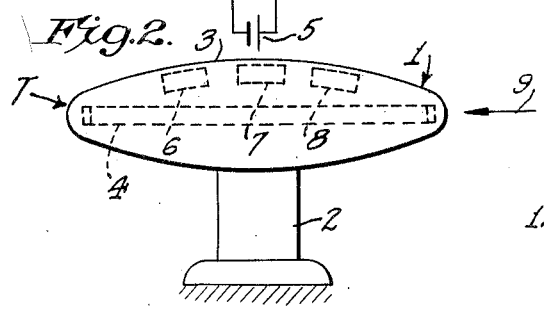
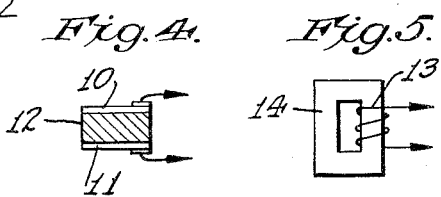
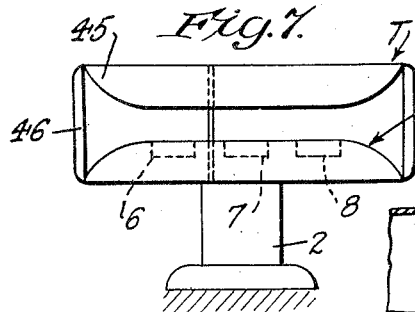
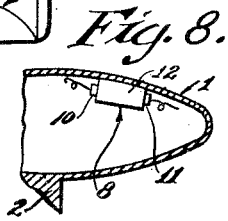
INVENTORS
Clarence A. de Giers
BY Abraham Edelman
Ernest D. Given
ATTORNEY Patented Feb. 7, 1950

2,496,339

UNITED STATES PATENT OFFICE 2,496,339

WIND DIRECTION INDICATOR

Clarence A. de Giers, Forest Hills, and Abraham Edelman, New York, N. Y., assignors to The Liquidometer Corporation, Long Island City, N. Y., a corporation of Delaware Application November 15, 1945, Serial No. 628,843

3 Claims. (Cl. 73—188)

This invention relates to devices for determining the direction of flow of fluids, particularly to devices for indicating the direction of flow of gaseous fluids such as air.

One object of the invention is to provide a novel and improved device for indicating at one point the direction of flow of gaseous and other fluids at a remote observation point.

Another object of the invention is to provide a novel and improved apparatus for indicating the direction of flow of gaseous and other fluids which is operated and controlled by electrical means, that is, without the employment of mechanical means moved by the fluid flow.

Another object of the invention is to provide a novel and improved apparatus for determining the direction of flow of gaseous and other fluids, comprising a transmitter of simple and sturdy design and free of movable parts, and a receiver electrically controlled by signals received from the transmitter, said transmitter being located and controlled at the point at which the direction of the fluid flow is to be determined, the receiver being located at another or observation point.

Another object of the invention is to provide a novel and improved electrically controlled apparatus for measuring or determining the direction of flow of gaseous and other fluids in which the receiver can be placed at any desired distance from the transmitter.

Other and further objects, features and advantages of the invention will be hereinafter set forth and the novel features thereof defined by the appended claims.

According to a now preferred embodiment of the invention the above enumerated and other objects of the invention hereinafter referred to are accomplished by providing a ratiometer located at a desired observation point and electrically connected to several temperature-sensitive impedance elements located at a remote control point and exposed to the flow of the fluid, the flow direction of which is to be measured by the ratiometer. A suitable heater maintains the temperature-sensitive elements at a higher than the ambient temperature. The temperature-sensitive elements are positioned to have their respective temperatures affected by the fluid flow, so that the fluid flow cools all the temperature-sensitive elements, but will cool the element or elements reached first by the flowing fluid more than other elements. Consequently, temperature gradients are set up which will unbalance the ratiometer and cause it to indicate the direction of the fluid flow. It should of course be understood that it is also within the scope of the invention to maintain the impedance elements at a temperature lower than the ambient temperature. Then, they will be heated differentially by the fluid flow to be supervised.

In the accompanying drawings several embodiments of the invention are shown by way of illustration and not by way of limitation. In the drawings:

Fig. 1 is a diagrammatic view of a measuring device according to the invention, including a transmitter and a receiver;

Fig. 2 is a diagrammatic side view of the transmitter of the measuring device according to Fig. 1;

Fig. 3 is a diagrammatic view of a modification of a measuring device according to the invention including a transmitter and a receiver;

Figs. 4, 5 and 6 show diagrammatic views of different types of temperature-sensitive impedance elements which may be used in a measuring device according to Fig. 1 or 2;

Fig. 7 is a diagrammatic side view of a modification of the transmitter of the measuring device according to Fig. 1; and Fig. 8 is a fragmentary view taken substantially in vertical section on a radius of the circular transmitter element shown in Fig. 2 through one of the temperature-sensitive impedance elements.

Referring now to the drawings in detail, there is shown in Figs. 1 and 2 a measuring device according to the invention constituted by a transmitter generally designated T and a receiver generally designated R. Measuring devices according to the invention can be conveniently employed to measure and indicate the direction of the prevailing wind. They can further be used to measure the direction of air currents in general, the direction of gas currents or of streams of liquids. The transmitter may, for instance, be located on an airfield and the receiver at a remote observation point such as the control tower of the airfield.

The transmitter comprises a housing 1 composed of a supporting section 2 and a cover 3 fastened to the housing by any suitable means such as screws. The housing may have any suitable shape. It has preferably a circular outline viewed from above and a comparatively flat stream-lined oval outline viewed laterally from its own level. It is made of material such as thin metal which can be heated to a reasonably high temperature such as 300 to 400° F. without changing shape and which has a comparatively high heat conductivity coefficient. The housing is mounted in a position in which it is exposed to and fully immersed in flow of the wind or other fluid, the direction of which is to be measured and indicated. Within the housing is provided a heater 4 such as an electric resistance wire connected to a source of current 5 such as a battery. The heater is placed and shaped so that it will substantially uniformly heat the periphery of the housing. Three or more, for example, three temperature-sensitive impedance elements 6, 7 and 8 are mounted in the housing in a non-linear position relative to each other, for instance, in the symmetric position shown in Fig. 1. The impedance elements are placed in close thermal contact with housing 1 so that they will be heated to substantially the temperature of the housing. They are further so placed that at the same time they will be affected by the cooling or heating effect of the fluid current indicated by an arrow 9 the direction of which is to be measured and indicated. Both these purposes can be conveniently accomplished by placing the impedance elements in contact with the housing cover 3 as shown in Fig. 2 and may be suitably secured thereto. The impedance elements are so designed that the self-heating of the elements by a current through the elements is so small as to be negligible. This can be readily accomplished by making the elements comparatively large. The temperature-sensitive impedance elements may be resistors, inductors, capacitors, etc.

Fig. 4 shows an element of the resistor type which comprises two plate electrodes 10 and 11 separated by a material 12 having a varying resistance value at different temperatures, such as iron wire, silver sulphide, certain rare earth oxides, or other known conductive or semi-conductive substances.

Fig. 5 shows an impedance element of the inductor type comprising a coil 13 wound on a temperature-sensitive magnetic core 14.

Fig. 6 shows an impedance element of the capacitor type comprising two electrodes 15 and 16 separated by a temperature sensitive dielectric material 17 such as any polar liquid, for instance, ethyl bromide $C_2H_5Br$, contained in a receptacle 18.

The receiver is constituted by an indicating or control instrument responsive to differences in currents, preferably by a ratiometer generally designated 20 which may have two, three or more coils and be operated either with A.-C. or D.-C. current. The ratiometer shown in Fig. 1 is a D.-C. operated ratiometer having three coils 21, 22 and 23 and a rotor 24 supporting a pointer 25 indicating on a stationary scale 26 calibrated in angles of wind direction. Each of the impedance elements, which in Fig. 1 may be assumed to be a temperature-sensitive resistor, is connected with one of the ratiometer coils in series through a source of current 27 such as a battery by wires 28, 29, 30 and a common wire 31 the latter including the source of current. Thus each of the impedance elements 6, 7 and 8 controls the current through one of the ratiometer coils. The ratiometer is preferably equipped with a suitable conventional pointer return device diagrammatically indicated by a magnet 32 which will return pointer 25 into its zero position when the currents through the ratiometer coils are substantially equal or no currents flow through the coils.

Each impedance or temperature-sensitive element may also have an impedance in parallel with itself for adjusting the characteristics of the respective element, as shown in Fig. 1 by resistors 40, 41 and 42 respectively.

The modification of the transmitter T shown in Fig. 7 is similar to the transmitter according to Fig. 2 as to the electrical elements placed in the housing. The transmitter housing itself may either have the shape as shown in Fig. 2 or a housing 1' may be provided shaped as shown in Fig. 7. Above housing 1' and spaced therefrom a shield 45 is provided supported on the housing by a plurality of posts 46 permitting a substantially free passage of the wind between housing 1 and shield 45. This shield serves to protect housing 1 against sun, rain and snow and may also serve as a guide for the fluid flow passing over housing 1'.

The operation of the measuring device as hereinbefore described is as follows:

Let it be assumed that there is no wind or other fluid current flowing against the transmitter. Then all three resistors will have the same or approximately the same temperature by the effect of heater 4. Consequently, the resistance value of all elements is equal and the currents through the ratiometer coils will also be equal. Hence the ratiometer pointer will indicate null by the action of pointer return device 32. When now wind or other fluid current flows against the transmitter housing, for instance in the direction indicated by arrow 9, the flow of air will cool the housing differentially, the maximum cooling occurring at the side from which the flow of air comes. The resistors will assume the temperature of the housing at the portion with which they are in close thermal contact and consequently will have different temperatures. In the example assumed above, resistor 8 will have the lowest temperature, resistor 7 a medium temperature and resistor 6 the highest temperature. Due to these different temperatures of the resistors the currents through the ratiometer coils will now differ. Consequently, rotor 24 and with it pointer 25 will now be deflected and the pointer will be placed in an angular position corresponding to the relative resistances of the resistors 6, 7 and 8 or, in other words, corresponding to the direction of the wind. In this connection it should be noted that the transmitter will be influenced not only by the flow direction, but to a certain extent also by the direction of the wind relative to the ground. However, the latter influence can be largely eliminated by proper distribution of the impedance elements within the housing and also by shielding the housing against rising or falling winds since in practice it is usually only of importance to measure the horizontal direction of the prevailing wind and temporary gusts of falling or rising winds may be neglected. The operation of the transmitter is the same when indicator or capacitor type impedance elements are employed such as are shown in Figs. 5 and 6. These elements may be connected with the ratiometer in the same manner as has been shown and described for resistor type elements, except that when capacitors as shown in Fig. 6 are used an A.-C. system must be employed.

In the previous description and also in Fig. 1 it has been assumed that the self-heating of the impedance elements is negligible and that the housing 1 and the elements are heated by heater 4. However, it should be noted that it is quite practical to depend upon self-heating of elements 6, 7 and 8 for raising the housing temperature when the elements are of the resistor type, and not use heater 4.

The modification of the measuring device shown in Fig. 3 is basically similar to the measuring device shown in Fig. 1. Hence, the same references are used to indicate corresponding parts. However, while in Fig. 1 the impedance elements are connected in series with the respective ratiometer coils, Fig. 3 shows an arrangement in which the impedance elements parallel the respective ratiometer coils. As will be seen from Fig. 3, each impedance element and each ratiometer coil is connected to the common battery 27 by a dropping resistor 33, 34 and 35 respectively. The dropping resistors are connected by wires 36, 37 and 38 to a common point 39 which in turn is connected by a wire 40 to one terminal of battery 27.

The operation of the measuring device according to Fig. 3 is the same as has been described for Fig. 1.

It should be understood that the invention is not limited to the circuit systems shown in Figs. 1 and 3, but that various other similar circuit systems may be employed and that, as has been mentioned before, a different type of ratiometer may be used. Furthermore, the impedance elements may be connected differently, for instance, in series as a ring in the manner employed in A.-C. and D.-C. Selsyn systems. Various other systems of this type will be readily apparent to circuit designers experienced in the art and are therefore not described here in detail.

While the invention has been described in detail with respect to certain preferred examples and embodiments, it will be understood by those skilled in the art after understanding the invention, that various changes and modifications may be made without departing from the spirit and scope of our invention, and it is intended therefore, in the appended claims, to cover all such changes and modifications.

What is claimed is:

1. In a device for measuring the direction of flow of a fluid generally in a predetermined plane, the combination of a transmitter including a housing located at a predetermined control point at which it is subjected to impingement by flow of the fluid from all directions, at least three temperature-sensitive impedance elements in said housing and in good heat transferring relation therewith, so as to follow closely any temperature changes of the portions of the housing with which said elements are respectively associated, said elements being respectively associated with spaced portions of the housing in spaced non-linear arrangement and in a plane generally parallel to said predetermined plane so as to be primarily affected by fluid flow in different predetermined directions respectively, electrical means for uniformly increasing the temperature of said housing, so as to establish a normal temperature for said elements substantially higher than that of the fluid, the flow direction of which is to be measured, whereby said elements will have a resultant temperature differential condition characteristic of the fluid flow direction; and a receiver located at an observation point remote from said transmitter and comprising a ratiometer including a plurality of deflecting coils, each connected in a circuit with a source of current and with one of said elements, the different temperatures of said elements caused by the fluid flow acting to control the current through each of said coils respectively in a manner corresponding to the temperatures of the respective elements as determined by the fluid flow direction, and means to indicate the flow direction according to the relative strengths of the coil currents.

2. In an apparatus for indicating the direction of air flow, a transmitter comprising a circular closed housing of good heat conducting material which is exposed to and subject to being differentially cooled by the air flow, said housing being disposed with its axis substantially vertical, a plurality of temperature-sensitive impedance elements symmetrically disposed around the vertical axis of and inside said housing and each in good heat transfer relation with the adjacent portion of the upper wall of the housing, means within the housing for heating all of said elements to the same normal temperature, which is substantially above the ambient temperature, a receiver comprising an indicator, and electrical means controlled by the impedance elements and responsive to the relative amounts of cooling thereof for setting the indicator to represent the point on the housing which has been affected the most by air flowing over this housing.

3. A device for indicating the direction of flow of a fluid, wherein said direction is always substantially in a predetermined plane comprising in combination a transmitter including a substantially closed housing of good heat conducting material which is exposed to said fluid, at least three temperature-sensitive impedance elements carried by said housing and disposed substantially in said plane and exposed to and in good heat transferring relation to the fluid flow past said housing, so that their temperatures will be affected by the temperature of said fluid, said temperature-sensitive impedance elements being positioned in spaced relation to one another and in a substantially non-linear arrangement in said plane, temperature affecting means located in heat transferring relation to all said elements for establishing a normal temperature for all of said elements substantially different from the temperature of said fluid, the direction of flow of which is to be indicated; and a receiver comprising an indicating means including a plurality of deflecting coils, each connected in a circuit with a source of current and with one of said elements, the different temperature of said elements current through each of said coils respectively in a manner corresponding to the temperatures of the respective elements as determined by the fluid flow direction, and means to indicate the flow direction according to the relative strengths of the currents in said coils.

CLARENCE A. DE GIERS.
ABRAHAM EDELMAN.

REFERENCES CITED

The following references are of record in the file of this patent:

UNITED STATES PATENTS

| Number | Name | Date |
|---|---|---|
| 1,291,489 | Hadaway | Jan. 14, 1919 |
| 1,841,607 | Kollsman | Jan. 19, 1932 |
| 2,214,181 | Rylsky | Sept. 10, 1940 |
| 2,237,077 | Lauck | Apr. 1, 1941 |
| 2,255,771 | Golay | Sept. 16, 1941 |
| 2,415,985 | Bechberger et al. | Feb. 18, 1947 |

FOREIGN PATENTS

| Number | Country | Date |
|---|---|---|
| 448,836 | Germany | Aug. 30, 1927 |